May 30, 1944.  A. G. BODINE, JR  2,350,212

METHOD AND APPARATUS FOR RELATIVELY MOVING TWO ELEMENTS

Filed Oct. 7, 1942

INVENTOR
ALBERT G. BODINE, JR.
BY
HARRIS, KIECH, FOSTER & HARRIS

*Clarence F. Kiech*
FOR THE FIRM
ATTORNEYS.

Patented May 30, 1944

2,350,212

UNITED STATES PATENT OFFICE 2,350,212

METHOD AND APPARATUS FOR RELATIVELY MOVING TWO ELEMENTS

Albert G. Bodine, Jr., Burbank, Calif., assignor to The Calpat Corporation, Los Angeles, Calif., a corporation of California Application October 7, 1942, Serial No. 461,222

30 Claims. (Cl. 74—1)

My invention relates to a novel method and apparatus for controlling the relative movement of two elements by employment of sound waves.

In various arts, there exists the problem of moving one element relative to another in response to energy transmitted to at least one of the elements from a remote point, the relative movement of the elements representing the end to be accomplished or serving as a means to that end. By way of example, it is often desirable to move two elements relative to each other while positioned in a deep well, by employment of energy from the surface of the ground. To do this mechanically usually requires two relatively movable members, for example two concentric pipes, extending to the surface of the ground.

It is an object of the present invention to control the relative movement of two elements from a remote point by employment of sonic principles. For example, in one embodiment of the invention, I can transmit sound waves to one of the two elements in actuating relationship therewith, these sound waves being transmitted thereto through an elastic medium. It is a further object of the invention to provide a novel method and apparatus for accomplishing such results.

Another object of the invention is to transmit sound waves to each of two relatively movable elements in actuating relationship therewith, the sound waves transmitted to one element being out of synchronism with those transmitted to the other element to effect relative movement between the elements. In this application, I speak of synchronism as involving two sound waves or pressure or rarefaction impulses occurring not only at the same frequency but also in phase with each other. Correspondingly, absence of synchronism may involve a difference in frequency, or a difference in phase between two identical frequencies.

It is another object of the invention to store sonic energy in an elastic medium and to employ the sonic energy at spaced positions along the wave path to control the relative movement of two elements.

Another object of the invention is to provide a composite or sectional wave path, the sound waves being transmitted through one section to one element and thence to the other element through another section. Further objects lie in the novel correlation of the characteristics of these sections to cause each of the elements to move out of synchronism with the other or to cause one element to move while the other remains substantially stationary through sonic forces applied thereto.

One of the general problems solved by the present invention is to vibrate one of two elements and retain the other substantially stationary in space. This may be for the purpose of avoiding movement between this other element and some other stationary element, or it may be for the purpose of retaining this other element substantially stationary without employment of a massive element having large inertia. As exemplary of the latter, the stationary element may comprise a handle for a vibrating tool and, according to one embodiment of the invention, this handle or element may be connected in a sonic system, whereby the sonic energy can be applied thereto to prevent objectionable vibration which might otherwise be avoided only by employment of a relatively massive handle or element. In other instances, the relatively stationary element may desirably represent an attachment means for attachment to another stationary element or to an element permitting only limited movement. The objects of the present invention include the provision of a novel sonic system for accomplishing such results.

It is another object of the present invention to move one element relative to another by employment of sound waves generated at a remote point and transmitted to at least one of the elements through an elastic member. In many instances, I prefer to correlate the frequency of the sound waves with the length of the elastic member to establish therein substantially a condition of resonance.

Other objects lie in the novel method and apparatus for generating sound waves and transmitting these through an elastic member.

Further objects and advantages of the invention will be evident to those skilled in the art from the following description of several embodiments of the invention which I have chosen to exemplify with reference to the problem of moving two elements relative to each other while disposed in a well. My co-pending application, Serial No. 397,252, of which this application is a continuation-in-part, discloses related and other elements associated with pipe-cutting means, the present application being directed to the general problem of employing a sonic system for controlling the relative movement of two elements and being directed to a sonic system not claimed specifically in the parent application, supra.

Referring to the drawing.

The invention will be described with reference to the general problem of moving two elements relative to each other by employment of sonic principles. This is preferably accomplished by sending sound waves through an elastic medium, e. g., an elastic member, such as a rod or pipe, or a column of fluid. By employment of terms such as "sound," "sound waves," "sonics," "sonic energy," or related terms, it should be understood that the frequency relationships involved are not limited to those within the audible range. Rather, such terms have relation to elastic, physical, or mechanical waves both within and without the audible range of frequency, such waves moving at the speed of sound in the elastic medium employed. Even if within the audible range, actual audibility by the human ear is not necessarily contemplated. The frequencies employed are those at which sonic transmission of energy through an elastic medium can be utilized effectively to move an element. In all instances, they exclude slow reciprocations or oscillations which would cause all sections of the elastic medium to move simultaneously in one direction or the other. Ordinarily, the lowest frequency contemplated by the invention would be at least several cycles per second, the upper frequencies extending in some instances considerably beyond the audible range and into the range of supersonics.

Figure 2:
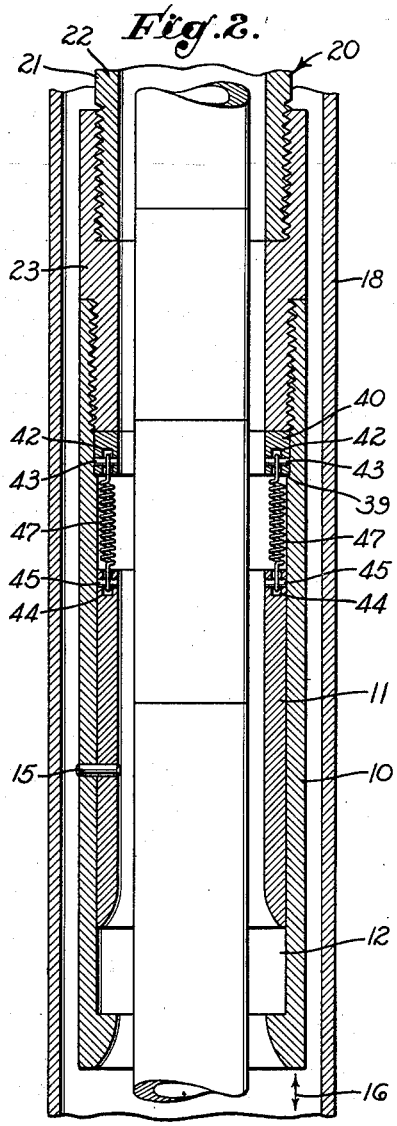
Figure 2 is a vertical sectional view of the relatively movable elements suggested in Figure 1.

In Figure 2, the elements which are to be relatively moved in response to sonic energy or sound waves are indicated, respectively, by the numerals 10 and 11. These elements may be of any form, without departing from the spirit of the invention. In Figure 2, the element 10 is tubular in shape, providing an annular recessed portion 12 in which the element 11, also shown as being tubular, is disposed. A shear pin 15 is shown as retaining these elements 10 and 11 in predetermined relative position before application of the sonic energy which effects shearing of this pin, as will be hereinafter described. Prior to the shearing of this pin, it impedes relative motion of the elements 10 and 11 beyond that permitted by the pin. Once the pin is sheared, the elements 10 and 11 may move vertically and more or less extensively relative to each other. In the embodiment shown in Figure 2, the element 10 is oscillated up and down, as indicated by the doubleheaded arrow 16, to effect relative movement with respect to the element 11, whether this latter element is stationary or moving.

Figure 1:
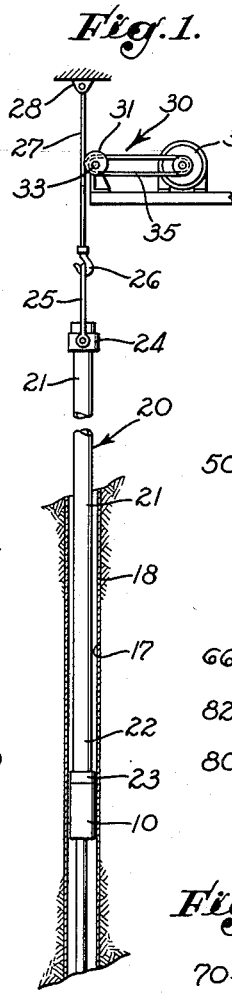
Figure 1 is a utility view showing diagrammatically a method of generating sound waves and transmitting these to two relatively movable elements positioned in a well.

As disclosed in Figures 1 and 2, the elements 10 and 11 may be disposed in a well 17 provided with a casing 18, and the element 10 may be oscillated vertically in response to sound waves transmitted thereto from the surface of the ground. These sound waves are transmitted through an elastic medium, in this instance a first or main elastic member, indicated generally by the numeral 20. The major portion of this elastic member 20 is shown as comprising a pipe 21, which may be formed of a plurality of sections secured together in a conventional manner. Such a pipe provides a lower end portion 22 which, as best shown in Figure 2, may be threaded to a coupling 23, to which, in turn, is threaded the element 10.

The upper end of the elastic member 20 provides an upper end portion to which the sound waves are applied. This upper end portion forms a part of the elastic member 20, and, as suggested in Figure 1, may include a swivel 24 pivoted to a bail 25 engaged by a hook 26 suspended by a cable 27, the uppermost end of which is secured to a suitable support or mounting 28. This system is particularly adapted to the sound-wave generating system disclosed in Figure 1, though it should be clear that the invention contemplates any system for generating sound waves and transmitting these longitudinally from one end portion of an elastic member to another end portion thereof, and thence to the element 10.

In the system shown in Figure 1, the weight of the suspended structure is carried by the support 28 and longitudinal sound waves can be established in the elastic member 20 and in the pipe 21 by transverse forces applied to the cable 27. These forces are applied by a sound-wave generating means 30 including an eccentric 31 contacting the cable 27. This eccentric may conveniently be of circular contour mounted eccentrically on a pivot 33 and driven by any suitable means, such as a motor 34 and belt 3⁵. Rotation of the eccentric 31 causes rapid lateral motion of the cable 27, with consequent small variations in the effective length of this cable, thus causing the upper end of the pipe 21 to be vibrated up and down at a frequency determined by the rotation of the eccentric 31. As the upper end of the pipe 21 is moved upward a slight distance, a tension or rarefaction impulse or wave is transmitted downward through the pipe to the element 10. Similarly, when the upper end of the pipe 21 is moved downward a small distance, a compression impulse or wave of substantially like value travels down the pipe 21 to the element 10. These tension and compression waves are produced alternately at a frequency determined by the speed of rotation of the eccentric 31. They travel through the pipe 21 at a speed dependent upon the speed of sound in the material of which this pipe is made. They tend to be reflected from the lower end of the suspended system to re-traverse the pipe 21 toward the sound-wave generating means 30, being again reflected by the support 28 to move downward in the elastic member 20. If, for example, a reflected pressure wave (or wave of condensation) reaches the sound-wave generating means at the same instant that another pressure pulse is being generated thereby, the pressures reinforce each other and the system can be made to resonate. Under conditions of resonance in the elastic member 20, there exists therein a standing wave and considerable energy can be stored in the elastic member.

It should be clearly understood that the invention does not presuppose the simultaneous upward movement of all sections of the elastic member 20 and a later simultaneous downward movement of all sections thereof. Rather, the energy is transmitted as wave motion. If a standing wave exists in the elastic member 20, the energy stored in such a resonating system will be primarily kinetic or velocity energy at one position and primarily potential or pressure energy at another position spaced one-quarter of a wave length away. In other words, there may be several zones spaced along the elastic member 20 a distance of one-half wave length apart, which are termed zones of maximum velocity variations, in which the molecules of the elastic member have a maximum to and fro vibration in a vertical direction, the energy here being primarily kinetic. Intervening will be zones in which there is substantially no up and down molecular motion, the energy in these zones being primarily potential energy and such zones being referred to as zones of maximum pressure variation. The wave energy changes from kinetic to potential at different sections of the elastic member 20. The wave form of both the compression and rarefaction waves will be substantially sinusoidal in such a resonating system, and such waves of substantially sine form are particularly desirable. The sound-wave generating means 30 is well adapted to the generation of such sine waves as it subjects the upper end of the pipe 21 to simple harmonic motion.

Figure 6:
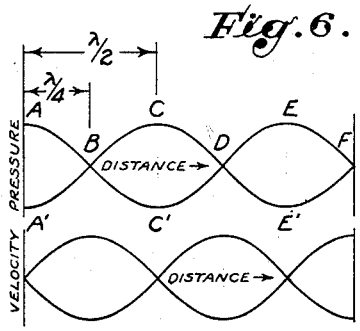
Figure 6 is a diagrammatic view representing graphically some of the sonic principles of the invention.

In Figure 6, an attempt has been made, in the upper curve, to show the pressure relationships of such a standing wave, the lower curve showing the velocity relationships. The generating device is at section A—A' and the element 10 is at point F. As it is desired that the element 10 should oscillate vertically, as indicated by the arrow 16, this element should be at or near a zone of maximum velocity variation. In other words, as the element 10 is at a "free end" of the acoustic system, the maximum degree of resonance and, correspondingly, the maximum degree of movement of the element 10 will be obtained if the length of the elastic member 20 is an odd multiple of one-quarter wave length of the sound waves generated by the sound-wave generating means 30.

The upper end portion of the elastic member 20 is substantially a zone of maximum pressure variation, as suggested by the distance between the points A and A'. At a somewhat lower position, one-quarter of a wave length away (represented by point B), the pressure energy will be a minimum but, as suggested in the lower curve, the velocity energy will be a maximum. At section C—C', the pressure energy is again a maximum, while the velocity energy is a minimum, this section being disposed one-half wave length ($\lambda/2$) from the section A—A'. At section F, where the element 10 is located, the pressure energy is a minimum and the velocity energy is a maximum. The curves of Figure 6 represent a resonant condition and, while operation at or near resonance is usually desired in the invention, it should be understood that this is not in all instances essential to effect the desired relative movement between the elements 10 and 11.

Assuming that the element 10 is moving up and down rapidly at a frequency determined by the sound-wave generating means 30, it is desired that there should be relative movement between the element 11 and this element 10. Such relative movement may take place if the element 11 remains stationary or moves out of phase with the element 10 or moves in phase therewith but with different amplitude. As best shown in Figure 2, the element 10 provides an annular shoulder 39 against which a ring 40 is pressed by the coupling 23. This ring provides a plurality of openings 42 traversed by pins 43, and the element 11 provides correspondingly positioned openings 44 traversed by pins 45. Springs 47 are positioned in the annular recessed portion 12, each spring having ends retained by the pins 43 and 45.

The springs 47 form a continuation of the wave path of the pipe 21 and transmit sound waves to the element 11. In other words, sound waves moving through the pipe 21 are delivered directly to the element 10 and indirectly, through the springs 47, to the element 11. The springs thus form a second elastic member to complement the first or main elastic member 20. They serve also as a capacitance in the wave-transmission system and they have a combined elasticity differing from that of the pipe 21.

If the element 11 were directly connected to the coupling 23, it would, of course, move synchronously with the element 10. This would also be true if the springs 47 were equivalent in their resonant wave pattern to a section of the pipe 21 of a length equivalent to the wave length of the sound waves. By designing the springs 47 so that their resonant wave pattern is different from that just described, relative movement between the elements 10 and 11 can be effected.

In many instances, it is desirable that the element 11 remain substantially in fixed position as the element 10 oscillates. This can be accomplished by designing the springs so that they are equivalent in their resonant wave pattern to, or have elastic characteristics substantially the same as, a continuation or section of the elastic member 20 having a length corresponding to one-quarter of the wave length of the sound wave. Under such circumstances, the spring constant of the combined springs is the same as a section of the pipe 21 having a length of one-quarter wave length. With such a design and if the element 10 is located at a zone of maximum velocity variation, the element 11 will be at a zone of minimum velocity variation and maximum pressure variation. The forces applied sonically to the element 11 will thus tend to retain it in fixed position without supplementary support even though the element 10 is moving up and down. Under such circumstances, the only tendency toward moving the element 11 up and down would be through frictional contact with the oscillating element 10; and this can be reduced to a minimum by anti-friction means or it can be eliminated entirely by spacing the elements 10 and 11 from each other, or by changing the spring design slightly to induce sonic forces on the element 11 which are substantially equal and opposite to friction-induced forces from the element 10.

In other instances, relative movement between the elements 10 and 11 can be effected by non-synchronous or out-of-phase movement of each of these elements. For example, if the springs are equivalent in their resonant wave pattern to a continuation or section of the elastic member 20 having a length corresponding to one-half the wave length of the sound, the element 11 will move upward at the time the element 10 is moving downward, this representing a maximum relative movement between the two elements. If the springs are made equivalent to other fractions of the wave length of the sound waves, it will be apparent that various degrees of relative movement between the elements 10 and 11 can be effected.

The relative movement of the elements 10 and 11 can be utilized to accomplish any desired result. As exemplary of such a result, the device can be lowered into the well with the shear pin 15 in place. Upon starting the sound-wave generating means 30, shear forces will be applied to this pin due to the tendency of the elements 10 and 11 to move relative to each other and, when these shear forces become sufficiently large, the pin 15 will shear. This shearing may, in itself, be the end to be accomplished or it may merely retain the elements 10 and 11 preparatory to the desired relative movement therebetween which is to accomplish other results.

Figure 3:
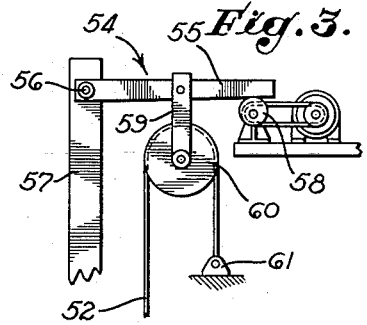
Figure 3 illustrates a modified sound-generating means.
Figure 4:
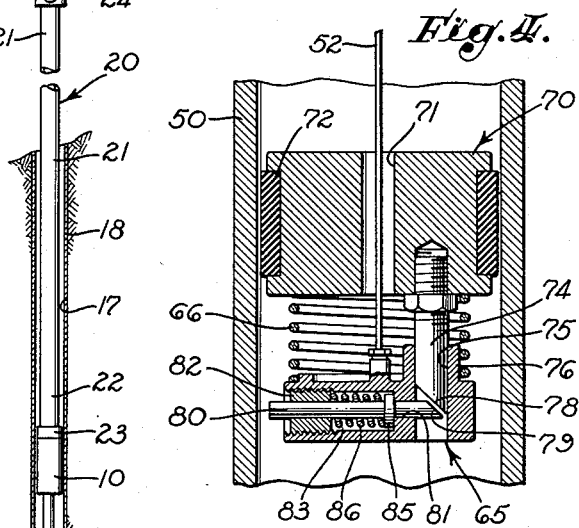
Figure 4 is a vertical sectional view of an alternative form of the invention.

An alternative embodiment of the invention, both as regards the sound-wave generating means and relatively moving elements, is shown in Figures 3 and 4. If desired, this device may be lowered in a tubing or casing 50, though it should be understood that the principles of operation can be equally well applied to other installations quite apart from encasement in a tubing or lowering in a well.

As suggested in Figures 3 and 4, the generated sound waves are transmitted through a first or main elastic member 52 which may be a length of wire or a rod under tension. The sound waves are applied to the upper end portion thereof by a sound-wave generating means 54. This means includes an arm 55 pivoted at 56 to a post or other support 57, the free end of the arm 55 resting on an eccentric 58, constructed and driven as previously described. A hanger 59 depends pivotally from the arm 55 and carries a pulley 60. The upper portion of the elastic member 52 extends upward and over this pulley and is anchored to the ground, or any means stationary with respect thereto, as indicated by the numeral 61. Upon rotation of the eccentric 58, sound waves are generated which traverse the elastic member 52, as previously described.

The lower end portion of this main elastic member 52 is secured to an element 65, corresponding generally to the element 10 previously described, as best shown in Figure 4. A compression spring 66 connects the element 65 to another element 70, corresponding generally to the element 11 previously described. The sound waves are generated at such frequency with respect to the length of the elastic member 52 that the element 65 is at a zone other than a zone of maximum pressure variation, and preferably at or near a zone of maximum velocity variation. Correspondingly, the sound waves cause the element 65 to oscillate vertically in response to the sound waves, as previously described with reference to the element 10.

At the same time, the spring 66 forms a continuation of the sound-wave path and transmits the sound waves upward to the element 70. The spring 66 acts as a second elastic member complementing the elastic member 52 in providing a path for the sound waves. If this spring is equivalent in its resonant wave pattern or in its elastic characteristics to a section of the elastic member 52 of a length of one-quarter of the wave length of the sound waves, the element 70 will remain substantially stationary in space and wave energy will be applied thereto in a manner to maintain it in substantially fixed vertical position. In such instance, the spring 66 acts merely as a capacitance and the condensation or compression impulses and tension or rarefaction impulses transmitted through it are reflected by the element 70 as like impulses, the springs representing, in effect, a continuation of the elastic member 52 of a length substantially equal to one-quarter of the wave length of the sound waves in this elastic member. Any other equivalent length or elasticity of the spring 66 will cause relative movement between the elements 65 and 70 except when equivalent to a section of the elastic member 52 having a length equal to a full wave length of the wave energy (in which event it would move in phase with the element 65).

In Figure 4, the element 70 provides a central opening 71 through which the elastic member 52 passes. It provides also a peripheral groove in which a ring 72 may be positioned. This ring may, for example, be formed of rubber and may represent merely a protective bumper or spacer. On the other hand, it may engage the pipe 50 and assist in maintaining the element 70 vertically stationary.

Relative movement between the elements 65 and 70 may be used for any desired purpose. As illustrative of one method of translating this relative motion into other motion, the element 70 is shown as carrying an extension 74 which is journalled in a socket 75 provided by the element 65 and by a collar 76 thereof. This serves to guide the relative motion of the elements 65 and 70. At the same time, the lowermost end of the extension 74 provides a beveled face or cam surface 78 adapted to engage a similarly beveled face 79 of a plunger 80 movable horizontally relative to the element 65. This plunger is journalled in an opening 81 and in the bore of a sleeve 82 threaded into a counterbore 83 of the element 65. The plunger 80 carries a flange 85 engaged by a spring 86 which tends to retract the plunger 80 until the flange 85 contacts the bottom of the counterbore 83. Movement of the plunger 80 can be made to serve any desired purpose, for example, making electrical or physical contact with the casing 50 or actuating other mechanism not shown. This system represents one way of translating relative vertical movement of the elements 65 and 70 into a horizontal movement of another element, for example, the plunger 80.

The system can be so designed that the cam surfaces 78 and 79 remain in contact throughout the relative path of motion of the elements 65 and 70, in which event a sinusoidal relative motion will be translated into a sinusiodal horizontal motion of the plunger 80. On the other hand, if the cam surfaces 78 and 79 separate during the relative movement of the elements 65 and 70, the motion of the plunger 80 can be made intermittent, the plunger being stationary during periods intervening advancement thereof at a rate determined by the shape and relative motion of the cam surfaces 78 and 79.

This embodiment of the invention illustrates an excellent way of damping out or minimizing motion of one element in a sonic wave path. It will be readily apparent that this system can be designed so that the element 70 remains substantially stationary irrespective of its inclusion in the wave path and, in fact, its relatively stationary position can be insured by the same wave energy as is employed in oscillating the element 65. Correspondingly, an element such as the element 70 can well be employed as a handle to guide a sonically vibrated element such as the element 65, which is operatively connected thereto, both by a mechanical connection and by the sonic connection provided by the spring 66.

Figure 5:
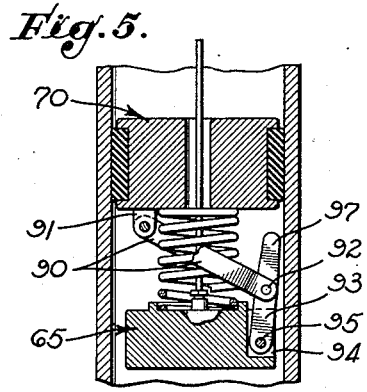
Figure 5 is a vertical sectional view of an alternative form of the invention.

As illustrative of another manner of controlling relative motion between the elements 65 and 70 into other types of motion, Figure 5 shows these elements as being mechanically connected by a linkage including a link 90 pivoted to a hanger 91 of the element 70 and pivoted at 92 to another link 93 which, in turn, extends into a cavity 94 of the element 65 and is pivoted on a pin 95. The link 93 extends beyond the pivot 92 to provide an end portion 97 which is thus moved to and fro in a locus of motion around the pin 95 and at a velocity determined by the linkages involved.

It will be apparent to those skilled in the art that the invention is adapted to numerous installations where it is desired to effect relative movement between two elements, e. g., where it is desired that one element remain relatively stationary as compared with the other. The relative movement can be adapted to any desired purpose. I believe it to be new to join two such elements in a wave path and to relate one portion of the wave-carrying elastic member, e. g., the member 52, to another portion, e. g., the spring 66, whereby sound waves are applied to both elements to control the relative motion thereof. I believe it to be new also to move one element relative to another in response to sound waves transmitted through an elastic member formed of solid material, such as the pipe 21 or the wire or rod 52. Such wave-transmitting members can be subject to constant tension or compression during the wave transmission and this is often desirable in a sonic system. Such tension or compression establishes a mean pressure (tension or compression), about which the compression or rarefaction pulses oscillate, such a mean value being represented in the upper curve of Figure 6 by the abscissa passing through the nodes of each of the two curves.

Various changes and modifications may be made without departing from the spirit of the invention as defined in the appended claims.

I claim as my invention:

1. A method for controlling the relative motion of two elements movable relative to each other, which method includes the steps of: continuously transmitting a train of sound waves of given pattern to one of said elements in a manner tending to move same; and continuously transmitting to the other of said elements a train of sound waves of the same pattern but out of synchronism with the sound waves transmitted to said one of said elements, thus tending to move said other of said elements with respect to said one of said elements.

2. A method for controlling the relative motion of two elements movable relative to each other, which method includes the steps of: continuously transmitting sound waves of given pattern to each of said elements at substantially the same frequency but out of phase with each other; and relatively moving said elements out of phase with each other in response to receipt of the out-of-phase sound waves transmitted respectively to said elements.

3. A method for controlling the relative motion of two elements movable relative to each other, which method includes the steps of: generating sound waves in an elastic medium under substantially resonant conditions whereby energy is stored in said elastic medium and is translated from pressure energy at one position of said elastic medium into kinetic energy at another position of said elastic medium; and applying the energy of said elastic medium at spaced zones therein of different kinetic energy respectively to said relatively movable elements to move same differentially.

4. In combination: a pair of movably-mounted elements; means for transmitting sound waves to one of said elements to move same; means for transmitting sound waves to the other of said elements out of synchronism with the sound waves transmitted to said one of said elements to move said other of said elements with respect to said one of said elements; and reciprocating means operatively connected to both of said elements to oscillate in response to relative movement of said elements.

5. In an apparatus for controlling the relative motion of two elements, the combination of: an elastic medium; means for generating sound waves in said elastic medium to move longitudinally therethrough; means for operatively connecting one of said elements to one portion of said elastic medium to be moved in response to the sound waves at said portion; and means for operatively connecting the other of said elements to said elastic medium at another portion thereof to be moved in response to the sound waves at said other portion, said other portion being spaced other than a multiple of one wave length from said one portion whereby said elements move relative to each other.

6. In an apparatus for controlling the relative motion of two elements, the combination of: a first elastic member; a second elastic member, said members respectively providing paths for sound waves and each of said elastic members providing two end portions; means for operatively connecting one of said elements to one end portion of each of said elastic members; means for operatively connecting the other end portion of said second elastic member to the other of said elements; and means for rapidly moving said elements relative to each other in response to sound waves, said last-named means including a sound-wave generating means operatively connected to the other end portion of said first elastic member for sending sound waves through this member to said one of said elements and through said second elastic member to said other of said elements.

7. A combination as defined in claim 6, in which said first and second elastic members are of different elasticity.

8. A combination as defined in claim 6, in which said second elastic member comprises a spring.

9. In an apparatus for controlling the relative motion of two elements from a point remote therefrom, the combination of: a first elastic medium extending from said remote point to one of said elements and providing a path for sound waves; a sound-wave generating means at said remote point for sending sound waves to said one of said elements through said first elastic medium along said sound-wave path thereof; and a second elastic medium forming a continuation of said sound-wave path of said first elastic medium and operatively connected to the other of said elements, said second elastic medium having the same elastic characteristics as a section of said first elastic medium of a length less than one full wave length of said sound waves.

10. In an apparatus for controlling the relative motion of two elements from a point remote therefrom, the combination of: a first elastic medium extending from said remote point to one of said elements and providing a path for sound waves; a sound-wave generating means at said remote point for sending sound waves to said one of said elements through said first elastic medium along said sound-wave path thereof; and a second elastic medium forming a continuation of said sound-wave path of said first elastic medium and operatively connected to the other of said elements, said second elastic medium having the same elastic characteristics as a section of said first elastic medium of a length substantially equal to one quarter wave length of said sound waves.

11. In an apparatus for controlling relative motion of two elements, the combination of: a relatively long elastic member formed of a solid elastic material and providing spaced end portions; means for operatively connecting one of said elements to one of said end portions of said elastic member; means for rapidly oscillating said one of said elements at a frequency of at least several cycles per second, said means including a sound-wave generating means operatively connected to the other end portion of said elastic member for impressing sound waves thereon at a frequency corresponding to the desired frequency of oscillation of said one of said elements, said sound waves travelling longitudinally along said elastic member and being reflected from said end portions, the length of said elastic member being so related to the frequency of oscillation of said one element and to the frequency of said sound-wave generating means as to establish substantially a condition of resonance in said elastic member; and means for retaining said other element relatively stationary with respect to the oscillation of said one element.

12. A combination as defined in claim 11, including a releasable means for retaining said elements in relatively fixed relationship before operation of said sound-wave generating means and releasable upon establishment of said resonant condition in said elastic member.

13. A combination as defined in claim 11, including means for impeding any relative motion of said elements by said sound-wave generating means beyond a predetermined relative position of said elements.

14. In a sonic apparatus for vibrating one of two elements from a point remote therefrom and for retaining the other element substantially stationary, the combination of: a first elastic member extending from said remote point to said one of said elements and providing a path for sound waves; a sound-wave generating means at said remote point for sending sound waves to said one of said elements through said first elastic member along said sound-wave path thereof to move said one of said elements, the frequency of said sound-wave generating means being such as to establish substantially a condition of resonance in said first elastic member; and a second elastic member operatively connecting said elements and forming a continuation of said sound-wave path of said first elastic member and of a length equivalent in its resonant wave pattern to a section of said first elastic member of a length substantially equal to one-quarter of the wave length of said sound waves.

15. In a sonic apparatus for vibrating one of two elements from a point remote therefrom and for retaining the other element substantially stationary, the combination of: an elastic member extending from said remote point to said one of said elements and providing a path for sound waves; a sound-wave generating means at said remote point for sending sound waves to said one of said elements through said elastic member along said sound-wave path thereof to move said one of said elements, the frequency of said sound-wave generating means being such as to establish substantially a condition of resonance in said elastic member; and a spring connected to each of said elements and extending therebetween, said spring having the same elastic characteristics as a section of said elastic member of a length of approximately one-quarter of the wave length of said sound waves.

16. In an apparatus for rapidly vibrating a movable element, the combination of: a relatively long elastic member formed of solid elastic material and providing spaced end portions; means for operatively connecting one of said end portions to said movable element; and means for rapidly moving said element at a frequency of at least several cycles per second, said means including a sound-wave generating means operatively connected to the other end portion of said elastic member for impressing sound waves thereon, said sound waves travelling longitudinally through said elastic member formed of solid elastic material, and being reflected from said one end portion to move toward said other end portion and tending to be again reflected from said other end portion to move toward said first end portion, the length of said elastic member being so related to the frequency of said sound-wave generating means as to establish substantially a condition of resonance in said elastic member.

17. A combination as defined in claim 16, in which said relatively long elastic member formed of solid elastic material consists of an elongated member in tension throughout its length.

18. A combination as defined in claim 16, in which said relatively long elastic member formed of solid elastic material extends substantially vertically, and in which said movable member is operatively connected to the lower end portion thereof and the sound-wave generating means is operatively connected to the upper end portion thereof whereby the weight of said elastic member imposes a tension in said elastic member substantially throughout its length.

19. In an apparatus for rapidly vibrating a movable element, the combination of: a relatively long elastic member formed of solid elastic material and providing spaced end portions; means for operatively connecting one of said end portions to said movable element; and means for rapidly moving said element at a frequency of at least several cycles per second, said means including a sound-wave generating means operatively connected to the other end portion of said elastic member for impressing sound waves thereon, said sound waves travelling longitudinally through said elastic member formed of solid elastic material.

20. A combination as defined in claim 19, in which said relatively long elastic member formed of solid elastic material consists of a metallic member under tension.

21. In combination: two relatively movable elements; an elastic member providing a movable end operatively connected to one of said elements to move same with respect to the other of said elements upon movement of said movable end, said elastic member also providing a drive end positioned at a point remote from said movable end; and sound-wave-generating means at said drive end for generating sound waves in said elastic member, said sound waves moving longitudinally along said elastic member to be reflected from said movable end to move same, the length of said elastic member being substantially an odd multiple of one quarter wave length of the sound waves generated by said sound-wave-generating means.

22. In combination: two relatively movable elements; a substantially vertical elastic member providing a vertically movable lower end, one of said elements being connected to said lower end to be moved therewith relative to the other of said elements; means for supporting the upper end of said elastic member in such manner that the weight of said elastic member establishes a tension substantially throughout said member; and sound-wave-generating means operatively associated with said elastic member adjacent the upper end thereof for establishing sound waves therein, the length of said elastic member being substantially an odd multiple of one quarter wave length of the sound waves generated by said sound-wave-generating means.

23. In combination: an element; a support; an elastic member hanging from said support, the lower end of said elastic member being movable and being connected to said element in such manner that vertical oscillation of said lower end of said elastic member will oscillate said element; and means for transversely oscillating said elastic member at a position below said support to establish sound waves moving longitudinally along said elastic member, the length of said elastic member being substantially an odd multiple of one quarter wave length of the generated sound waves.

24. In combination: two relatively movable elements in adjacent relationship; a sectional elastic medium providing a first section extending from a remote point to one of said elements for acoustic actuation of this element from said remote point; means for establishing sound waves in said elastic medium at said remote point to move said one of said elements; and means comprising a second section of said elastic medium for transmitting said sound waves into actuating relationship with the other of said elements to move same with respect to said one element in out-of-phase relationship therewith.

25. In combination: a pair of relatively movable elements; a first means for transmitting sound waves to one of said elements to move same; a second means for transmitting said sound waves from said one of said elements to the other of said elements, said second means being of such character as to transmit the sound waves to said other element out of phase with the transmission of the sound waves to said one of said elements by said first means whereby said one of said elements is moved relative to said other of said elements; and a structure separate from said second sound-wave-transmitting means for interconnecting said elements.

26. A combination as defined in claim 25, in which said structure comprises two relatively movable members respectively connected operatively to said elements.

27. In an apparatus for controlling the relative motion of two elements, the combination of: an elastic medium; a sound-wave generator for generating sound waves in said elastic medium at such frequency as to establish substantially a condition of resonance therein giving rise to zones of maximum velocity variation and maximum pressure variation spaced along said elastic medium one quarter wave length apart, the molecules of said elastic medium having a maximum to-and-fro vibration in such zone of maximum velocity variation and a minimum vibration in such zone of maximum pressure variation; and two relatively movable elements spaced from each other and respectively associated operatively with said elastic medium at spaced positions therealong to receive and be responsive to the molecular vibration of such medium at such spaced positions, one of such positions being further removed from such zone of maximum velocity variation than the other position.

28. A combination as defined in claim 19, including a second sound-wave-transmitting member connected to receive said sound waves from said sound-wave generating means, and a second element operatively connected to said second sound-wave-transmitting member to be moved thereby out of synchronism with the movement of said first-named movable element.

29. A combination as defined in claim 16, including a second sound-wave-transmitting member connected to receive said sound waves from said sound-wave generating means, and a second element operatively connected to said second sound-wave-transmitting member to be moved thereby out of synchronism with the movement of said first-named movable element, said second sound-wave-transmitting member having the same elastic characteristics as a section of said relatively long elastic member of a length less than one full wave length of said sound waves.

30. In combination: two relatively movable elements in adjacent relationship; a first elastic medium extending from a remote point to one of said elements for acoustic actuation of this element from said remote point; a second elastic medium operatively connected to the other of said elements for acoustic actuation of same; and means at said remote point for establishing sound waves in said first and second elastic media to move said elements in out-of-phase relationship, said second elastic medium being of such character as to transmit the sound waves to the other of said elements out of phase with the transmission of the sound waves to said one of said elements by said first elastic medium.

ALBERT G. BODINE, JR.